Figure 1:
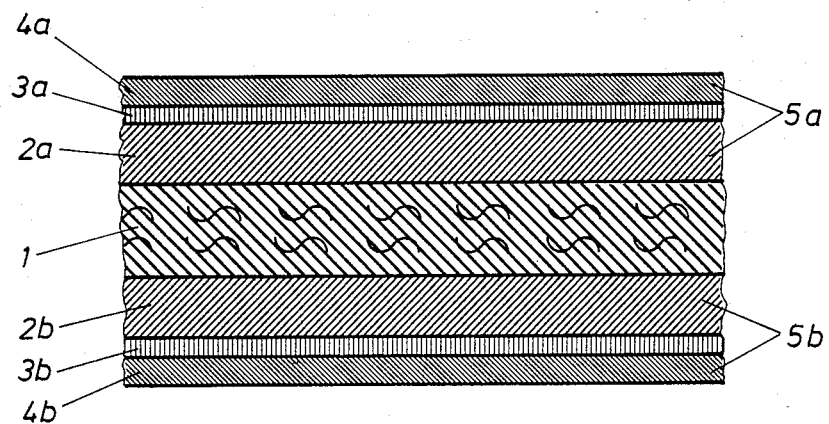

United States Patent [19]

Hoppe et al.

[11] Patent Number: 4,497,872
[45] Date of Patent: Feb. 5, 1985

[54] SEALED IDENTIFICATION CARD WITH BLOCKING LAYERS

[75] Inventors: Joachim Hoppe, Munich; Wolfgang Gauch, Otterfing, both of Fed. Rep. of Germany

[73] Assignee: GAO Gesellschaft fur Automation und Organisation mbH, Fed. Rep. of Germany

[21] Appl. No.: 586,884

[22] Filed: Mar. 12, 1984

Related U.S. Application Data

[63] Continuation of Ser. No. 420,869, Sep. 21, 1982, abandoned.

[30] Foreign Application Priority Data

Sep. 28, 1981 [DE] Fed. Rep. of Germany ....... 3138559

[51] Int. Cl.³ .............................................. B32B 27/06
[52] U.S. Cl. .................................... 428/483; 428/203; 428/497; 428/514; 428/518; 428/520; 283/107; 283/108; 283/109; 283/110; 283/904
[58] Field of Search ............... 428/483, 514, 497, 518, 428/520, 203; 283/107, 108, 109, 110, 904

[56] References Cited

U.S. PATENT DOCUMENTS

| 2,712,514 | 7/1955 | English | 154/121 |
| 2,932,913 | 4/1980 | Hannon | |
| 3,402,488 | 9/1968 | Leavitt | 40/2.2 |
| 3,716,439 | 2/1973 | Maeda | 156/269 |
| 3,887,757 | 6/1975 | Stone et al. | 428/520 |
| 4,096,015 | 6/1978 | Kawamata et al. | 156/273 |
| 4,105,818 | 8/1978 | Scholle | 428/520 |
| 4,170,681 | 10/1979 | Edwards et al. | 428/205 |
| 4,284,681 | 8/1981 | Tidmarsh et al. | 428/520 |

FOREIGN PATENT DOCUMENTS 2451081  11/1980  France .

Primary Examiner—George F. Lesmes
Assistant Examiner—P. R. Schwartz
Attorney, Agent, or Firm—Bacon & Thomas

[57] ABSTRACT

An identification card protected against external chemical influences of the environment, having blocking layers in its outer areas to prevent plasticizers and other chemical substances which reduce stability and durability from penetrating inside the card. The blocking layers consisting of PETP (polyethylene terephtalate), PE (polyethylene), paper or other chemically resistant materials are located on the surface of the card, preferably in compound films with the construction PVC/blocking layer/PVC, between which the card core bearing the personalization data is laminated in. Thus partial embeddings such as signature stripes, magnetic stripes, photos, etc. can also be provided in the surface layer, the inner PVC layers of the card still being optimally protected by the blocking layers against the negative consequences of the influence of plasticizers, such as fatigue fracture and bending tears.

6 Claims, 7 Drawing Figures

SEALED IDENTIFICATION CARD WITH BLOCKING LAYERS

This application is a continuation of application Ser. No. 420,869, filed Sept. 21, 1982, now abandoned.

The invention relates to a multilayer identification card having inner layers which essentially absorb the mechanical stress to which the card is exposed and are sensitive to environmental influences.

Data carriers, in particular identification cards, which are designed as multilayer card laminates and are used, for example, for identifying persons, are generally known and are becoming increasingly important in the form of credit cards, company identification, etc., in day-to-day life.

In the course of time, a number of identification cards have been proposed which are mainly aimed at impeding or preventing attempted forgery by making use of many different protection techniques depending on the design of the card. Since such identification cards are becoming more and more widespread and are used for an expanding range of purposes, the requirements to be met by the protective quality of such data carriers with respect to attempted forgery have not only increased; there is also growing interest in identification cards which have, along with a particularly high degree of protection, a long lifetime and are relatively insensitive to the stresses of daily use.

An identification card with a particularly high degree of protection is disclosed in German Auslegeschrift No. 27 56 692. The card core of this identification card may either consist of plastic such as PVC (polyvinyl chloride) or a paper blank designed as a security paper which is subsequently laminated between PVC cover films by a development of the time-tested plate laminating method. The advantage of using PVC for the cover films is its good thermoplastic ductility at usual laminating temperatures which allows for such security features as signature stripes and magnetic stripes to be embedded in the cover layers without difficulty. In addition to the excellent laminating qualities of PVC as opposed to paper and PVC, the good flowability of the material causes superficial roughness to be evened out thus creating a smooth mirror-finished surface with an excellent optical appearance.

Further, the deep drawing property of PVC allows the personalization data of the card owner to be embossed in relief on the identification cards, thus allowing for a widespread and desirable security feature on the card. High impact resistance and light fastness are further properties of PVC which make a positive contribution to the appearance of the identification card.

However, the use of PVC for cover films involves disadvantages. Due to the material properties of PVC as well as incorrect handling and storage of the cards by the user, the lifespan or validity of the identification cards may be greatly limited. Low temperatures, for example, lead to the material becoming brittle and under high temperatures dimensional stability decreases rapidly. The relatively low bending load index of PVC leads to a lack of resistance against bending tears and fatigue fractures, especially in the case of cards with long validity.

An essential disadvantage of the PVC hard films used in the production of identification cards is the influence of so-called plasticizers. Even a small addition of plasticizer changes the properties of the PVC hard films, as is known from experience, so that they are quick to become brittle and breakable. But the influence of plasticizers can hardly be avoided in practice since the use of plasticizers in the plastic products which are almost universal today belongs to the established production techniques of the plastic industry.

It has been shown in practice, for example, that the storage of identification cards usually takes place, in spite of clear indications of the negative consequences, in containers with a high plasticizer content, e.g. in imitation leather wallets, soft PVC cases, etc. Direct contact with these "protective cases" results in the plasticizers gradually passing from the plastic products to the PVC layers of the card. Since it is practically impossible to avoid contact between identification cards, which are subject to frequent use, and other plastic products containing plasticizers and the plasticizers passing into the PVC layers of the card, this means that the cards gradually become brittle, their stability decreases and thus their lifespan is considerably limited.

U.S. Pat. No. 2,932,913 discloses an identification card in which a printed paper core has PETP films stuck on both sides of it. PETP (polyethylene terephthalate), as opposed to PVC, is characterized by very good mechanical properties, for example, great stability and nondeformability over a large range of temperatures and a high bending load index. Although this type of identification card is thus very stable and therefore has a correspondingly long lifespan, it involves the disadvantage that embedding of card elements such as magnetic stripes, signature stripes, etc., is not possible. A further disadvantage is due to the limited deep drawing property of PETP. Thus identification cards consisting mainly of PETP material which are to be personalized by embossing in relief yield quite deficient results.

The problem on which the invention is based is thus to provide an identification card which is resistant to chemical environmental influences and can be embossed in relief in the conventional manner.

This problem is solved according to the invention by arranging on both sides of the inner layers blocking layers which prevent plasticizers and other chemical substances that reduce stability and durability from penetrating inside the card.

In an exemplary embodiment of the invention, the card core consists of a layer of paper designed as a security paper or dyed PVC to bear the personalization data. On each side of the core layer there is a further PVC layer. In order to protect these PVC layers, and possibly also the PVC core layer, against external chemical influences of the environment, in particular against seeping plasticizers, there are blocking layers on both sides consisting, for example, of paper, PETP, a PE (polyethylene) adhesive or another material known to the expert to prevent plasticizers from passing through. In case the blocking layer cannot be laminated (e.g. paper, PETP) and/or does not allow for any partial embeddings such as signature stripes or magnetic stripes, the entire card is then laminated between two thin PVC cover films so that partial embeddings are possible in the cover film.

In the production of the card, compound films are preferably used with a possible layer constructions of PVC/blocking layer/PVC or blocking layer/PVC, so that only the card core must be laminated in between the compound films, whereby the plate laminating technique which has proved successful for conventional PVC identification cards may be used.

However, it is also possible to apply the blocking layer only when the card is complete by dipping or spraying methods, whereby the partial embeddings such as signature stripes, etc., may be covered by masks.

The advantage of these embodiments is that the PVC which has proved so useful in the production of identification cards and exhibits so many advantages can continue being used without the disadvantages of this material, i.e. premature fatigue fracture and bending tears due to the influence of plasticizers, being involved. The advantages of the PVC cards and their production, such as the possibility of partial embeddings, very good laminating properties and smooth mirror-finished surfaces, are retained.

Using thin PETP films as blocking layers which are of little thickness compared to that of the card, the cards can still be provided with embossing in relief since the embossing properties of the card are only slightly affected by the thin layers, and plastic deformability is guaranteed in the embossing areas by the properties of the PVC layers. A further advantage of using PETP for the blocking layers must be seen in its mechanical properties which additionally increase card stability and thus the lifespan of the identification card. The arrangement of the PETP layers in the layer construction of the card is not crucial, since the stability of the card as a whole is greater than in the case of conventional PVC cards, and possible damage of the unprotected PVC cover films has no essential effect on the entire stability of the card when they adhere well to the blocking layer.

Further advantages and embodiments of the invention shall be described with reference to the figures stated below.

Figure 2:
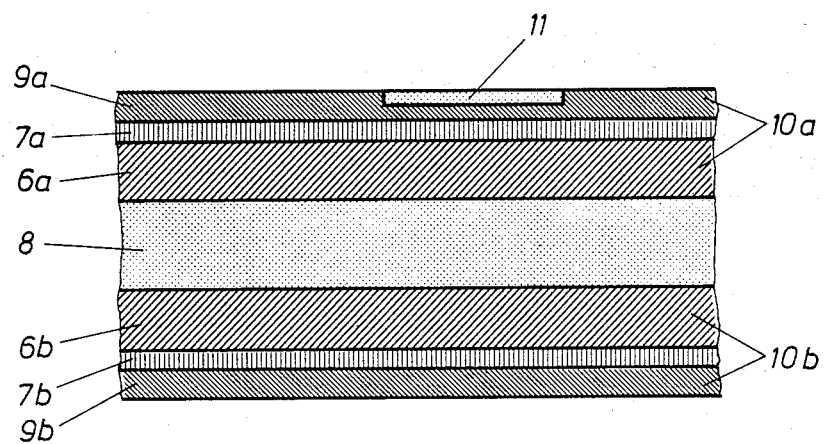
Figure 3:
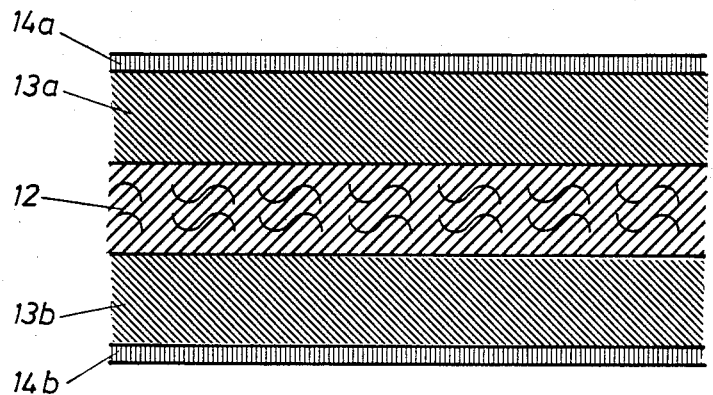
Figure 4:
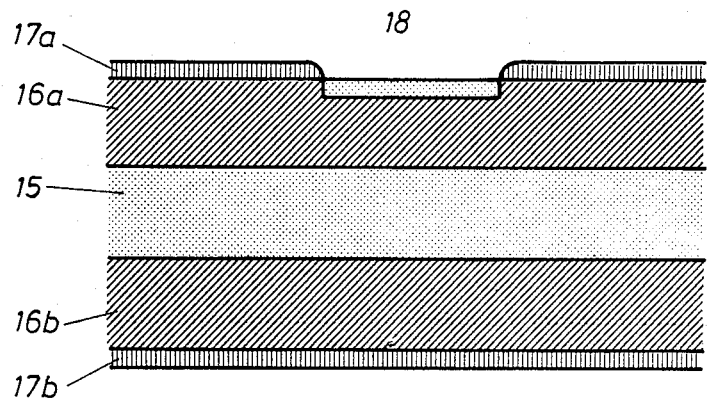
Figure 5:
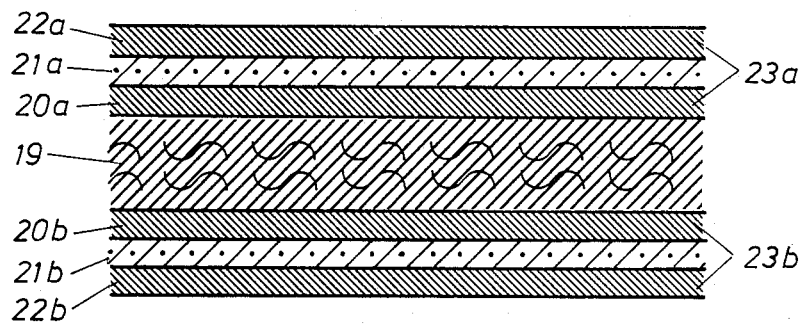
Figure 6:
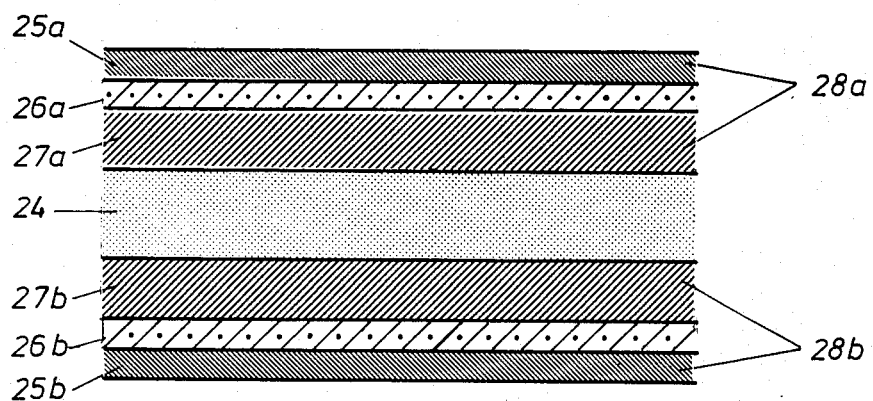
Figure 7:
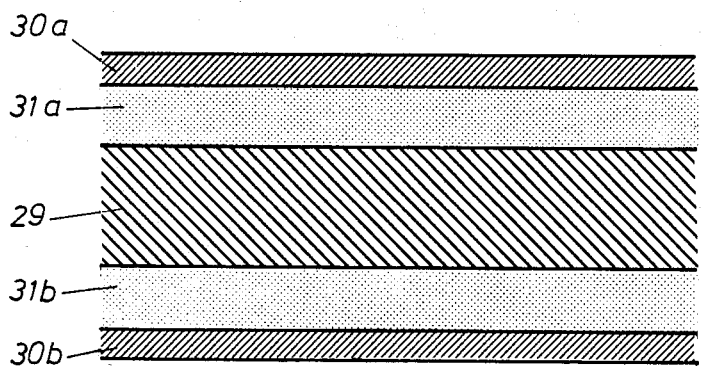

FIG. 1 card with PVC core and PE adhesive blocking layer;

FIG. 2 as in FIG. 1 with paper core and partial embedding;

FIG. 3 card with PVC core and blocking layer on the surface;

FIG. 4 as in FIG. 3 with paper core and partial embedding;

FIG. 5 card with PVC core and PETP blocking layer;

FIG. 6 card with paper core and PETP blocking layer;

FIG. 7 card with paper blocking layer.

FIG. 1 shows a cross-section of an inventive embodiment of an identification card. The card core consists of a dyed PVC layer 1 bearing the card information, personalization data and security features. Core layer 1 is laminated between two compound films 5a,b comprising PVC layers 2a,b, suitable blocking layers 3a,b (e.g. PE adhesive) and PVC cover layers 4a,b. The inner PVC layers 1 and 2a,b are protected against external environmental influences such as seeping plasticizers causing brittleness and bending tears by blocking layers 3a,b in such a way that the lifespan of the card is not affected by subsequent changes in its material properties. Penetration of plasticizers in the outer PVC cover layers 4a,b has no negative consequences since the thickness of these layers is negligible and the actual stability of the card is ensured by the protected core layers 1 and 2.

FIG. 2 shows a card construction analogous to that of FIG. 1, the only difference being that the core layer here consists of a paper core 8 which may be designed as a security paper with possible security features such as watermarks, security threads, etc. The PVC layers 6a,b which contribute to the stability of the card are protected against the penetration of plasticizers by the chemically resistant blocking layers 7a,b. PVC cover layers 9a,b allow for the embedding of a signature stripe 11 or a magnetic track to carry magnetic data due to their thermoplastic ductility and their very good flow properties during lamination. The thickness of layers 9a,b should be selected—just as in FIG. 1—so that it is no problem embedding signature stripes, magnetic stripes and so on.

In both of the embodiments described, the optical appearance known for conventional PVC identification cards is retained as a smooth mirror-finished surface. It is also advantageous that the identification cards can be produced with the time-tested plate laminating technique due to the very good laminating properties of PVC.

FIGS. 3 and 4 show further inventive embodiments of an identification card in which the protective layers are located directly on the card surface.

In FIG. 3 the core layer consists of a dyed PVC layer 12 enclosed by two further transparent PVC layers 13. The protective or blocking layers 14a,b can either be applied to the finished card by dipping, spraying or spreading methods or compound films are used during the production of the card in which PVC layer 13 is already provided with protective layer 14.

FIG. 4 shows an analogous layer arrangement, whereby the core layer is a paper core 15 and a signature stripe 18 is provided. In this construction, signature stripe 18 is laminated into PVC layer 16 and the protective or blocking layer is then applied, the signature stripe 18 being covered by a mask. When a ductile material is used for the blocking layer, the signature stripe can of course also be laminated into the uppermost layer, as shown in FIG. 2.

FIG. 5 shows a further embodiment in which card core 19 consists of a dyed PVC layer which is laminated between two compound films 2a,b. Compound films 23a,b consist of PETP layers 21a,b which are enclosed by two PVC layers 20a,b and 22a,b. In addition to the very good chemical resistance of PETP and its blocking effect against plasticizers, its excellent mechanical properties such as dimensional stability in wide temperature ranges also ensure increased card stability and a longer lifespan for the identification card.

FIG. 6 shows a card construction analogous to that of FIG. 5, in which the card core consists of a paper layer 24 which may also be designed as a security and is laminated between two compound films, 28a,b. PETP layers 26a,b located between PVC layers 25a,b and 27a,b prevent plasticizers from penetrating layers 27a,b. Due to the excellent mechanical properties of PETP layers 26a,b in addition to their protection against plasticizers, the card stability and robustness of the identification card are increased even when PETP layers are very thin, so that embossing in relief is possible even when PETP is used.

In the card construction shown in FIG. 7, with a card core 29 of PVC, the blocking layer against plasticizers is formed by two paper layers 31a,b which also bear the card information or personalization data. The entire arrangement is then laminated between two PVC cover layers.

Summing up, it may be said that the inventive card construction with its time-tested card materials such as PVC, paper, PETP and PE adhesive allows for the production of identification cards having a considerably longer lifespan than conventional PVC identification cards, since their inner PVC layers are protected by chemically resistant blocking layers against the influence of plasticizers. In certain embodiments, the excellent surface quality and optical appearance of the known PVC cards are retained; one also has the possibility of providing partial embeddings such as signature stripes, photos and magnetic stripes in the card surface. In any case one has the possibility of embossing in relief. Thus an identification card is provided having all the advantages of the known PVC cards, but having a considerably longer lifespan and thus allowing for a longer period of validity, which is desirable from an economic point of view.

We claim:

1. A multilayered identification card having an inner layer made of polyvinyl chloride and cover films on each side of the inner layer in the form of compound films having the structure polyvinyl chloride/blocking layer/polyvinyl chloride, wherein the thickness of said blocking layer is small compared to that of the card, whereby said blocking layer prevents the penetration of plasticizers into the inner layer of the card without adversely affecting the embossing properties of the card.

2. An identification card according to claim 1, wherein said blocking layer consists of a polyethylene terephthalate film.

3. An identification card accorrding to claim 1, wherein said blocking layer consists of a polyethylene adhesive layer.

4. An identification card according to claim 1, wherein said blocking layer consists of a thin sheet of paper.

5. An identification card according to claim 1, wherein said blocking layer consists of a thin varnish coating.

6. A method of producing an identification card comprising a core made of polyvinyl chloride which bears at least a portion of the identification data and cover films on each side of the core in the form of compound films having the structure polyvinyl chloride/blocking layer/polyvinyl chloride, wherein the thickness of said blocking layer is small compared to that of the card, comprising laminating said core between said cover films.

* * * * *